United States Patent

Horikawa et al.

[11] 3,894,077
[45] July 8, 1975

[54] ANTISTATIC AGENT FOR PLASTICS

[75] Inventors: Takeshi Horikawa; Hiroshi Yagihara; Masayoshi Kubo, all of Saitama, Japan

[73] Assignee: Daicel Ltd., Osaka, Japan

[22] Filed: Feb. 25, 1974

[21] Appl. No.: 445,587

[30] Foreign Application Priority Data
Feb. 27, 1973 Japan.............................. 48-23518

[52] U.S. Cl........ 260/501.12; 260/563 R; 260/80.7; 260/85.5 R; 260/77.5 R; 260/78 R; 260/92.8 R; 260/93.5 C; 260/DIG. 20
[51] Int. Cl.......................................... C07c 143/00
[58] Field of Search .............................. 260/501.12

[56] References Cited
UNITED STATES PATENTS

| | | | |
|---|---|---|---|
| 2,129,264 | 9/1938 | Downing et al. | 260/501.12 |
| 3,198,822 | 8/1965 | Mannheimer | 260/501.12 |
| 3,474,038 | 10/1969 | Sepulveda et al. | 252/137 |
| 3,539,521 | 11/1970 | Snoddy et al. | 260/501.12 |
| 3,673,158 | 6/1972 | Reader et al. | 260/501.12 |

FOREIGN PATENTS OR APPLICATIONS 4,226,523 12/1967 Japan............................ 260/501.12

1,077,772 8/1967 United Kingdom............ 260/501.12

Primary Examiner—Howard T. Mars
Assistant Examiner—Nicky Chan
Attorney, Agent, or Firm—Woodhams, Blanchard and Flynn

[57] ABSTRACT

An antistatic agent for plastics comprising a compound of the formula;

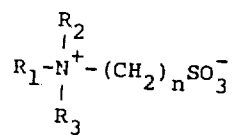

wherein $R_1$ is a hydroxyalkyl group of the formula

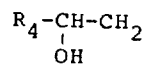

(in which $R_4$ is an alkyl group having 6 to 16 carbon atoms), $R_2$ is a lower alkyl group having 1 to 4 carbon atoms or a hydroxyalkyl group of the same kind as $R_1$, $R_3$ is a lower alkyl group having 1 to 4 carbon atoms, and n is an integer of 1 to 4.

3 Claims, No Drawings

ANTISTATIC AGENT FOR PLASTICS

BACKGROUND OF THE INVENTION

1. Field of the Invention

This invention relates to a novel antistatic agent for plastics.

2. Description of the Prior Art

In general, plastics have a higher electric insulation resistance than other materials. Accordingly, plastics are readily statically charged by friction and many troubles are caused by static charges. As a familiar example, an unpleasant pricking irritation is given to human bodies when garments of synthetic fibers are worn, or dust is adsorbed on a plastic molded article to injure the appearance thereof. Further, at the step of processing plastics or on handling thereof, static charges bring about various troubles such as accumulation of dust at the compounding step or an electric shock given to human bodies at the processing step.

Accordingly, it is important to prevent generation and/or accumulation of static electricity during the step of molding plastics and in the molded plastic articles. As means for preventing such generation or accumulation of static charges, there have heretofore been proposed and studied various methods, including a method comprising coating the surface of a plastic molded article with a surface active agent having an antistatic property, a method comprising mechanically kneading the antistatic agent into the plastic material prior to the molding step, and other similar methods.

However, when an antistatic agent for plastics is actually employed, not only the antistatic property but also various practical conditions such as influences on inherent properties of plastics, the safety to human bodies, troubles at the molding and processing steps and the change of quality with the lapse of time should be taken into consideration. Moreover, it is desired that the antistatic agent has a suitable compatibility with plastics and it causes neither blooming nor discoloration. A method comprising kneading an antistatic agent into a plastic material is especially adopted for attaining a durable antistatic effect, but most antistatic agents used in this method are unstable at high temperatures adopted at the processing step and tend to cause such undesired phenomena as decomposition and discoloration.

SUMMARY OF THE INVENTION

The purpose of the present invention is to provide an antistatic agent for plastics which is stable at high temperatures at the processing step and causes neither decomposition nor discoloration when kneaded into a plastic material, which improves the lubricating property and processability of a plastic material, and which has a suitable compatibility with a plastic material and causes no inter-action with other additives such as a plasticizer, a stabilizer and the like. We have discovered that a compound represented by the following general formula;

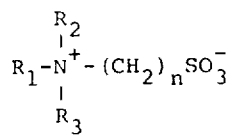

(I)

wherein $R_1$ is a hydroxyalkyl group represented by the general formula

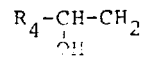

(in which $R_4$ stands for an alkyl group having 6 to 16 carbon atoms), $R_2$ stands for a lower alkyl group having 1 to 4 carbon atoms or a hydroxyalkyl group of the same kind as $R_1$, $R_3$ is a lower alkyl group having 1 to 4 carbon atoms, and n is an integer of 1 to 4, has excellent effects as an antistatic agent for plastics.

Japanese Pat. Publication No. 26523/67 discloses an antistatic agent composed of a compound of a structure similar to that of the above compound of this invention, namely a compound represented by the following formula;

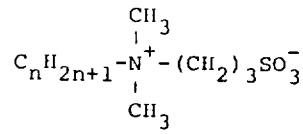

wherein n is an integer of 12 to 16. However, as is illustrated in Examples given hereinafter, the antistatic agent of this invention has a much higher antistatic effect than the above known analogous compound, and when the antistatic agent of this invention is kneaded into a plastic material, it is stable at high temperatures and causes neither decomposition nor discoloration. Thus, in the compound of this invention, the presence of the hydroxyl group results in a prominent antistatic effect and a good stability at high temperatures.

The compound represented by the above general formula (I) is a novel compound which can be prepared by a combination of several known methods in the following manner.

An α-olefin obtained by, for example, oligomerization of ethylene or thermal decomposition of paraffin is reacted with a peracid such as peracetic acid or an epoxidation agent such as hydroperoxide to form an α-olefin oxide, and then it is reacted with a primary amine or a secondary amine to form a tertiary amine. The aimed compound represented by the above formula (I) is formed by reacting the thus obtained tertiary amine with a sultone. This reaction between the tertiary amine and the sultone is generally carried out in the presence of an alcohol as a solvent.

In case the obtained reaction product is used as an antistatic agent in this invention, it is necessary to remove the solvent therefrom, and, for this purpose, a conventional desolvation process can be adopted.

Further, we have studied and developed a method for preparing the compound of this invention more effectively, in which the above tertiary amine is reacted directly with a sultone in the absence of a solvent by employing a reaction vessel having a function of kneading and mixing highly viscous materials efficiently, such as a kneader, to obtain the antistatic agent of this invention easily without the necessity of such processes as separation or purification. In this method, the mole ratio of the fed tertiary amine to the sultone is maintained at 1, and the reaction is carried out at 50° to 140°C, preferably 70° to 120°C, for 1 to 10 hours, preferably 3 to 5 hours. It has been found that according to this method the aimed compound can be obtained in such a high yield as 98% or higher and the quality of the product is better than that of the product obtained according to the method using a solvent.

The amount of the antistatic agent to be kneaded into a plastic molding composition varies depending on the particular kind of the plastic material employed, but it is generally preferred that the antistatic agent is used in an amount of 0.1 to 5.0 percent by weight, especially 0.3 to 3 percent by weight based on the weight of the plastic material.

The antistatic agent of this invention has a suitable compatibility with various thermoplastic resins such as homopolymers and copolymers, such as vinyl chloride-vinyl acetate copolymers, of vinyl chloride, polystyrene resins including acrylonitrile-styrene (AS) or acrylonitrilebutadiene-styrene (ABS) copolymer resins, polethylene, polypropylene and other poly($\alpha$-olefins), polyamide resins, polycarbonate resins, etc., and it is very stable at high temperatures. Therefore, when the antistatic agent of this invention is kneaded into these thermoplastic resins, they can be processed and molded with ease. It has been found that the antistatic agent of this invention exhibits a good lubricating property at the molding step and improves the moldability of the resin compound. Further, because of the presence of a long-chain, saturated alkyl group, the antistatic agent of this invention is slightly soluble in water and, hence, it has a good water resistance. The compound of this invention is not only very excellent in the original antistatic effect but also shows little change in this high effect with the lapse of time. Moreover, the antistatic agent of this invention is not poisonous and gives no irritation to the skin, and, therefore, it can be added at the processing step. These are advantages of the antistatic agent of this invention.

The excellent effects attained by the antistatic agent of this invention will now be illustrated more in detail by reference to the following examples, but the scope of the invention is not limited by these examples which are given for purposes of illustration only.

PREPARATION EXAMPLE 1

104 Parts of an alkylene oxide mixture obtained by treating a mixture of $\alpha$-olefins having 12 and 14 carbon atoms, respectively, with peracetic acid was incorporated with 67.7 parts of an aqueous solution containing 40% by weight of dimethylamine and 123 parts of isopropyl alcohol as a solvent, and the mixture was heated under agitation at 80°C for 4 hours in a sealed reaction vessel. After completion of the reaction, the solvent and unreacted dimethylamine were removed by distillation under reduced pressure to obtain 125.3 parts of the corresponding tertiary amine. Then, 130 parts of the thus obtained tertiary amine was admixed with 62 parts of propane sultone and 300 parts of isopropyl alcohol as a solvent, and the reaction was carried out for 3 hours by heating the mixture at 50°C. Then, the reaction mixture was cooled to room temperature, and precipitates were recovered by filtration under reduced pressure to obtain 200 parts of a white waxy solid having a melting point of 140°C, in which the amine content was 0.8 percent by weight. The compound obtained in this Preparation Example 1 is designated as "antistatic agent A."

PREPARATION EXAMPLE 2

An autoclave was charged with 400 parts of a mixture of alkylene oxides having 16 and 18 carbon atoms, respectively, 213 parts of an aqueous solution containing 40 percent by weight of dimethylamine and 200 parts of methyl alcohol, and the mixture was reacted at 100°C for 6 hours. In the same manner as described in Preparation Example 1, 465 parts of the corresponding tertiary amine was recovered from the reaction mixture. Then, 137 parts of the thus obtained tertiary amine was admixed with 49 parts of propane sultone and 240 parts of isopropyl alcohol, and the reaction was carried out at 60° to 70°C for 4 hours. In the same manner as described in Preparation Example 1, 180 parts of a white waxy solid having a melting point of 160°C was recovered from the reaction mixture. The compound obtained in this Preparation Example 2 is designated as "antistatic agent B."

PREPARATION EXAMPLES 3 AND 4

Antistatic agents C and D were prepared from alkylene oxides having 8 and 10 carbon atoms, respectively, according to the method described in Preparation Example 1. Reaction conditions and results are summarized in Table 1.

Table 1

| Preparation of Tertiary Amine | Preparation Example 3 | Preparation Example 4 |
| --- | --- | --- |
| alkylene oxide | $C_8$, 6.4 g | $C_{10}$, 7.8 g |
| dimethylamine | 2.9 g | 2.9 g |
| methyl alcohol | 8.0 g | 8.0 g |
| reaction temperature | 80°C | 80°C |
| reaction time | 5 hours | 5 hours |
| yield of tertiary amine | 8.4 g | 9.1 g |
| Preparation of Antistatic Agent | | |
| tertiary amine | 9.3 g | 11.4 g |
| propane sultone | 6.2 g | 6.2 g |
| isopropanol | 30 g | 30 g |
| reaction temperature | 50°C | 50°C |
| reaction time | 4 hours | 4 hours |
| yield of antistatic agent | 9.5 g | 10.6 g |
| designation | antistatic agent C | antistatic agent D |

The antistatic agent D was recrystallized from ethanol and sufficiently dried to obtain needle crystals having a melting point of 171°–172°C. Then, the antistatic agent D was subjected to identification by IR, NMR and elementary analysis. Results are as follows:

1. Infrared Absorption Spectrum Analysis:

1050 cm⁻¹, 1200 cm⁻¹;  characteristic absorption bands owing to $SO_3^-$
3450 cm⁻¹;  characteristic absorption band owing to OH 2. Nuclear Magnetic Resonance Spectrum Analysis:

| δ value | | hydrogen number ratio* |
|---|---|---|
| 0.85 | terminal methyl of long chain | 3 |
| 1.28 | long chain of methylene, $(CH_2)_7$ | 14 |
| 2.25 | $N^+-CH_2-\underline{CH_2}-CH_2-SO_3^-$ | 2 |
| 3.26 | $\underline{CH_2}-\overset{\overset{CH_3}{\|}}{\underset{\underset{CH_3}{\|}}{N^+}}-\underline{CH_2}-CH_2-\underline{CH_2}-SO_3^-$ | 12 |
| 4.20 | $CH_2-\underline{CH}-CH_2$<br>　　　$\|$<br>　　　OH | 1 |
| 4.73 | -OH | 1 |

*: the hydrogen number ratio was determined from the integration curve.

3. Elementary Analysis:

| | Found Value | Theoretical Value $(C_{15}H_{33}NSO_4)$ |
|---|---|---|
| carbon | 55.73% | 55.69% |
| hydrogen | 10.42% | 10.28% |
| nitrogen | 4.24% | 4.33% |

From the foregoing results, the antistatic agent D was identified as a compound having the following structure:

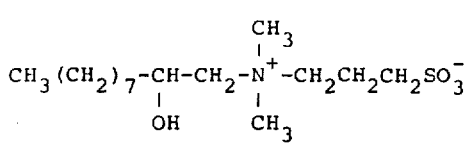

Antistatic agents A to D prepared in Preparation Examples 1 to 4 were tested as samples in the following Examples.

EXAMPLE 1

100 Parts of a vinyl chloride resin (polymerization degree of 800), 2.5 parts of a stabilizer (dibutyl tin maleate), 20 parts of a plasticizer (dioctyl phthalate) and 0.5 part of the antistatic agents A, B of this invention were sufficiently mixed and kneaded at 170°C for 5 minutes by means of a hot roll. Then, the kneaded resin compound was molded into sheets of 0.6 to 1.0 mm in thickness, and several sheets were piled and pressed at 170°C to obtain a sheet of 1.5 mm in thickness.

The antistatic effect in the resulting sheet was determined by employing a static honest meter (trade name, manufactured by Shishido Shokai) and Ultra Megohmmeter Model SM-10 (Toa Electronics LTD.). As a comparative sample, an antistatic agent having a structure similar to that of the antistatic agent of this invention and represented by the following formula;

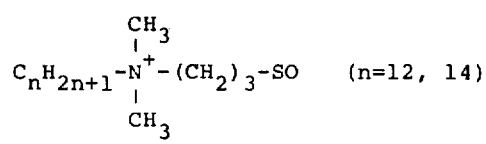

was tested under the same conditions. Results are shown in Table 2.

In the tables, the term "∞" means that no reduction of the initial electric charge was observed.

Table 2

| Antistatic Agent | Half Life | Surface Resistivity (Ω) | Heat Resistance (180°C x 30 min) | Processability | Remarks |
|---|---|---|---|---|---|
| 1) antistatic agent A | 4 seconds | $3.2 \times 10^{11}$ | slightly colored | good | product of this invention |
| 2) antistatic agent B | 22 seconds | $9.0 \times 10^{11}$ | slightly colored | good | product of this invention |

Table 2—Continued

| Antistatic Agent | Half Life | Surface Resistivity (Ω) | Heat Resistance (180°C x 30 min) | Processability | Remarks |
|---|---|---|---|---|---|
| 3) blank | ∞ | $8.0 \times 10^{12}$ | slightly colored | somewhat bad | control |
| 4) $C_nH_{2n+1}-\overset{+}{\underset{CH_3}{\overset{CH_3}{N}}}-(CH_2)_3-SO_3^-$ (n=12,14) | ∞ | $8.5 \times 10^{12}$ | yellowish brown | good | comparative sample |

1.0 Part of the antistatic agent of this invention was uniformly blended into a so-called record compound comprising 100 parts of a vinyl chloride-vinyl acetate copolymer resin (polymerization degree of 450), 1.5 parts of an epoxidized soybean oil (oxirane content=7.0 percent), 1.0 part of a stabilizer (di-n-octyl-tin-S,S'-bis(iso-octylmercaptoacetate) and 0.3 part of a lubricant (calcium stearate), and the blend was kneaded at 150°C for 5 minutes by means of a hot roll. The kneaded compound was formed into sheets of 0.6 to 1.0 mm in thickness and several sheets were piled and pressed at 170°C to obtain a sheet of 1.5 mm in thickness. The properties of the resulting sheet were determined and compared in the same manner as in Example 1 to obtain results shown in Table 3.

100 Parts of a commercially available ABS resin (a graft copolymer obtained from 6 parts of styrene-butadiene rubber, 72 parts of styrene and 28 parts of acrylonitrile) was blended with 1.5 parts of the antistatic agent and the blend was mixed and kneaded at 185°C for 5 minutes to obtain a sheet of 0.6 to 1.0 mm in thickness. The resulting sheet was cut into pellets of 5 mm × 5 mm in size. The pellets were molded into an article 50 mm × 50 mm × 2 mm in size by employing an Arburg universal injection molding machine (Model C4/D manufactured by Western Trading Co.). The antistatic characteristics of the resulting molded articles were determined in the same manner as in Example 1 to obtain results shown in Table 4.

tic agent A, B, C or D of this invention or a comparative antistatic agent having a structure similar to that of the antistatic agent of this invention and represented by the formula

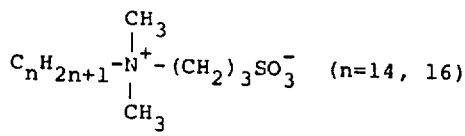

$$C_nH_{2n+1}-\overset{+}{\underset{CH_3}{\overset{CH_3}{N}}}-(CH_2)_3SO_3^- \quad (n=14, 16)$$

Table 3

| Antistatic Agent | Half Life (seconds) | Surface resistivity (Ω) | Heat Resistance (180°C × 10 min) | Processability |
|---|---|---|---|---|
| antistatic agent A | 18 | $3.2 \times 10^{12}$ | slightly colored | good |
| blank | ∞ | $2.1 \times 10^{16}$ | slightly colored | slightly bad |
| commercially available product | 48 | $8.5 \times 10^{12}$ | yellowed | slightly bad |

Table 4

| Antistatic Agent | One Day After Molding | | One Week After Molding | |
|---|---|---|---|---|
| | charged voltage (mV) | half life (seconds) | charged voltage (mV) | half life (seconds) |
| antistatic agent A | 95 | 2 | 65 | 1 |
| antistatic agent B | " | " | 70 | " |
| antistatic agent C | " | 3 | 95 | 2 |
| antistatic agent D | " | " | " | " |
| $C_nH_{2n+1}-\overset{+}{\underset{CH_3}{\overset{CH_3}{N}}}-(CH_2)_3SO_3^-$ (n=14,16) | " | 24 | " | 23 |
| blank | " | ∞ | " | ∞ |

From the results shown above, it is seen that each of the antistatic agents of this invention is superior to the comparative antistatic agent having a similar structure and represented by the formula;

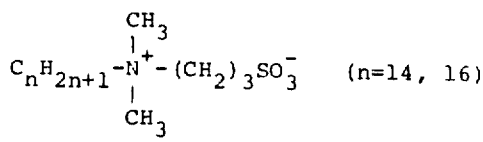

with respect to their antistatic effects.

The embodiments of the invention in which an exclusive property or privilege is claimed are defined as follows:

1. An antistatic agent of the formula;

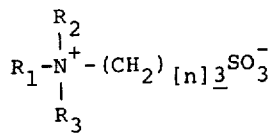

wherein $R_1$ is hydroxyalkyl having the formula

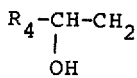

in which $R_4$ is alkyl having 6 to 16 carbon atoms, $R_2$ is the same as $R_1$ or alkyl having 1 to 4 carbon atoms, and $R_3$ is alkyl having 1 to 4 carbon atoms.

2. An antistatic agent according to claim 1, in which $R_2$ and $R_3$ are methyl.

3. An antistatic agent of the formula;

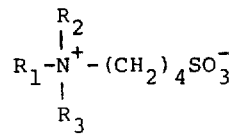

wherein $R_1$ is hydroxyalkyl having the formula

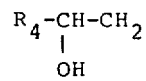

in which $R_4$ is alkyl having 6 to 16 carbon atoms, $R_2$ is the same as $R_1$ or alkyl having 1 to 4 carbon atoms, and $R_3$ is alkyl having 1 to 4 carbon atoms.

* * * * *

UNITED STATES PATENT OFFICE
CERTIFICATE OF CORRECTION

Patent No. 3,894,077     Dated July 8, 1975

Inventor(s) Takeshi Horikawa, Hiroshi Yagihara and Masayoshi Kubo

It is certified that error appears in the above-identified patent and that said Letters Patent are hereby corrected as shown below:

Col. 9, line 20; correct the formula to read as follows:

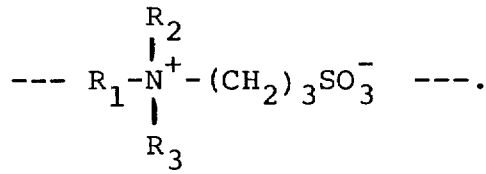

Signed and Sealed this eleventh Day of November 1975

[SEAL]

Attest:

RUTH C. MASON
*Attesting Officer*

C. MARSHALL DANN
*Commissioner of Patents and Trademarks*